3,035,042
SULFONATED-LIGNIN-IRON-CHROMIUM COMPLEX AND PROCESS OF MAKING THE SAME

Charles H. Hoyt, Camas, Wash., assignor to Crown Zellerbach Corporation, San Francisco, Calif., a corporation of Nevada
No Drawing. Filed Feb. 23, 1960, Ser. No. 10,105
12 Claims. (Cl. 260—124)

This invention relates to an improved composition especially adapted for use as a drilling mud additive and to the process of making the same. More particularly, this invention relates to a composition comprising a sulfonated-lignin-iron-chromium complex which is characterized by being non-oxidative toward ferrous ion and to a process for its preparation.

It is known that the drilling of wells, such as oil or gas wells, is effectuated with the aid of a circulating drilling fluid or mud which serves several purposes. It cools and lubricates the drill; it removes and transports drill cuttings to the surface; it helps the drill bit perform by its hydraulic action; it cements or seals the wall of the drill hole; it holds drill cuttings in suspension when drilling operation is stopped; it forms a hydrostatic head which serves as a means for controlling high pressure gas, oil, or water flows. These and other properties which are essential for a satisfactory drilling mud would be impossible to attain without use of certain additives, since native muds cease to perform satisfactorily at depths exceeding a few thousand feet.

Various drilling fluid additives have been suggested over a period of the last several years. Such materials include bentonite, starch, gums, tannins, high colloidal content clays, sodium silicate, etc. A more recent development is the application of ligninsulfonates either alone or in combination with chromates and/or iron. Such compositions have met with some success under special conditions, but their overall efficiency is impaired by the fact that they either gel shortly after their preparation or the properties of drilling muds containing such compositions, particularly viscosity, gel strength and water loss are not entirely satisfactory in the drilling operations.

It has now been discovered that the quality of drilling mud additives containing ligninsulfonates may be substantially improved by carefully controlling the process of their preparation. The principal object of this invention, therefore, is the provision of a process for the preparation of a composition comprising essentially a sulfonated-lignin-iron-chromium complex which is non-oxidative toward ferrous ion.

A further object of this invention is the provision of an improved composition especially adapted for use in or as a drilling mud additive, which composition effectively lowers viscosity of mud, produces muds having exceptionally low gel strengths and low water loss, is stable in drilling holes under high temperature conditions and does not form cement with quartz and siliceous materials when subjected to a temperature above 250° F.

Another object of the invention is to provide an improved composition suitable as an additive to drilling muds, which composition may be prepared in a simple manner and which is low in cost.

Still another object of this invention is the provision of a novel process for combining sulfonated lignin with chromium and iron constituents in such a manner that when such composition is incorporated into a drilling mud, the physical properties and other characteristics of such mud are greatly improved.

The importance of this invention and the advantages afforded thereby will be more fully appreciated from the detailed description and claims which follow.

Briefly, the process of this invention comprises mixing together, in aqueous medium, a water-soluble iron salt, a water-soluble chromate, and a sulfonated lignin material, the amount of the latter material being in excess of the amount of iron and chromium incorporated. The resulting liquid reaction product is interacted with a water-soluble ferrous salt to produce a final composition which is non-oxidative toward ferrous ion. If desired, the resulting ferrous ion-containing complex may be spray-dried under substantially reducing conditions, whereby the composition is obtained in the form of a free-flowing, finely divided powder.

Accordingly, the essential constituents of the composition of this invention are: a sulfonated lignin material, a water-soluble iron salt, and a water-soluble chromate. Such combination, when prepared in accordance with the procedure explained hereinbelow, gives a well drilling additive of greatly improved characteristics. Thus, the composition of the invention when admixed with a drilling mud greatly enhances the drilling operation, particularly under severe conditions of shale, quartz, siliceous materials, gypsum, and salt contamination as well as under high temperature, yet without danger of gelling in a relatively short period of time. From all observations, it appears that the iron salt apparently reacts with the chromate to form a complex and such complex is further complexed with the sulfonated lignin by some chemical or physical reaction. While I do not intend to be limited by any theory expressed herein, it appears that incorporation of a ferrous salt into the complex produces the unexpected improvements in the final composition when used as an additive to drilling muds.

The sulfonated lignin materials suitable for use in the preparation of the composition of this invention include sulfonated alkali lignins, i.e. sulfonated kraft lignins or soda lignins, as well as calcium, ammonium, magnesium, or sodium ligninsulfonates which are normally obtained in the form of sulfite spent liquor from the pulping of wood or other lignocellulose materials by the conventional sulfite or bisulfite processes. Although the composition of the spent sulfite liquor is somewhat variable depending upon the cooking conditions and the fibrous material used, its content of ligninsulfonates ranges generally between about 40 and about 70% by weight (dry basis). A product of this type is a sodium-base or ammonium-base sulfite spent liquor manufactured and sold by Crown Zellerbach Corporation, San Francisco, California, under the trademark Orzan in liquid form in a wide range of concentrations, as well as in the form of a dry powder. Sulfite spent liquors having other bases, such as calcium or magnesium are also suitable for carrying out the objects of this invention.

Sulfite spent liquors from which the sugars have been partially or completely removed by any of the usual methods, and thus containing primarily ligninsulfonates, are also suitable for use in this invention.

The sulfonated alkali lignins mentioned hereinabove may be produced by precipitating alkali lignin contained in alkaline spent pulping liquor by means of a mineral acid, isolating the precipitated lignin material and treating it with ether sulfurous acid or a water-soluble bisulfite until a water-soluble sulfonated lignin material is formed.

The second essential constituent of the composition of the present invention, namely a water-soluble iron salt may be any of the commercially available salts, such as iron sulfate, iron chloride, iron nitrate, iron acetate, etc.

The third essential constituent of the composition, namely a water-soluble chromate may be employed in the form of sodium, potassium, calcium chromates or dichromates, and the like.

The compositions of the present invention may be prepared in the form of a solution in a liquid medium, preferably water, or in the form of a dry, free-flowing powder. In preparing the composition of this invention, a water-soluble iron salt, preferably a ferric salt is mixed in aqueous medium with a water-soluble chromate, using any conventional mixing equipment. The resulting reaction mixture is then admixed with the sulfonated lignin material and the aqueous solution is allowed to interact until a sulfonated-lignin-iron-chromium complex is formed.

The pH of the resulting complex solution should be regulated to a value of between about 2 and 5. The iron-chromium complex is usually very acidic. If it is desired to increase its pH, alkaline salts may be added thereto in order to raise its pH to a desirable level. Examples of suitable alkaline salts are: sodium, calcium, potassium carbonates, bicarbonates, acetates, gluconates, and the like. It is essential, however, that the amount of the alkaline salt added to the iron-chromium complex solution be such as not to cause formation of a precipitate in the solution. Also, the pH value of the sulfonated lignin solution may be lowered, if necessary, in order to avoid formation of a precipitate of hydroxides of iron or chromium upon admixing the sulfonated lignin solution with the iron-chromium complex.

The resulting sulfonated-lignin-iron-chromium complex is then interacted with a ferrous salt, such as ferrous sulfate, ferrous chloride, ferrous ammonium sulfate, etc., in order to make certain that the final composition has a substantial ferrous ion content.

In the preferred embodiment of this invention the resulting liquid complex containing ferrous ion is spray-dried in conventional spray-drying equipment under substantially reducing conditions to produce a free-flowing, powdered sulfonated-lignin-iron-chromium complex which is non-oxidative toward ferrous ion. Such composition is very useful as an additive to well drilling muds.

Although the relative proportions of the three essential constituents of the present composition may vary within a wide range, the practical applications have indicated that the iron salt should be used in a proportion to supply from about 1 to 20 parts by weight of iron metal, the chromate incorporated should supply from about 0.25 to 3 parts by weight of chromium metal and the sulfonated lignin material should be present in the complex in an amount from about 50 to 90 parts, dry solids basis. The preferred range of the iron metal, chromium metal, and sulfonated lignin constituents, is 3 to 10, 0.5 to 2, and 60 to 70 parts by weight, respectively. It should be noted, however, that the minimum ratio of iron metal to chromium metal must be at least 1.5 to 1, preferably at least 2 to 1, higher ratios having no harmful effects on the effectiveness of the final composition. It is also highly important that the final composition contains at least 2% by weight of iron metal in the form of ferrous ion.

It will be understood by those skilled in the art that the amount of the composition of this invention to be supplied to a drilling mud will vary depending on the type of the drilling mud employed in the drilling operation. For instance, in ordinary sodium-base muds, the composition of this invention performs very satisfactorily in dispersing clay, thereby giving sufficiently low viscosity at high solids content and satisfactory gel qualities with low water loss.

When calcium deposits and salt contamination occur in the drilling operations, gypsum- and lime-based muds may be admixed with the composition of this invention. Drilling muds of this type combined with the composition of this invention perform very satisfactorily, as they reduce the effect of a contaminant, remove the contaminant from the solution, and add auxiliary colloidal substance which is unaffected by the contaminants. Furthermore, the composition of this invention enhances heat stability and other qualities of the muds under severe conditions of shale, quartz, gypsum, and salt contamination at elevated temperature conditions.

If desired, a suitable defoaming agent may be incorporated into the composition of this invention in order to prevent air entrainment in the mud during drilling operations. Suitable defoaming agents include aliphatic alcohols having at least 4 carbon atoms in the molecule, such as amyl, lauryl, stearyl, cetyl alcohols; sulfonated castor oils; substituted imidazolines; and substituted oxazolines. The amount of the defoaming agent to be incorporated into the composition may vary to a certain extent depending on the type of the defoaming agent and the nature of the drilling mud. An amount of 0.1–1% of the defoamer, based on the solids content of the composition of the invention, has been found satisfactory.

The following examples illustrate, but in no way limit the compositions of this invention, the methods of their preparation, and their application as additives for drilling muds. All the amounts in the examples are expressed in parts by weight.

EXAMPLE 1

18 parts of ferric sulfate, corresponding to 3.6 parts of Fe metal, were dissolved in 30 parts of water at room temperature. 3 parts of sodium dichromate, corresponding to 1.05 parts of Cr metal were added, dissolved and both components were mixed for 10 minutes until the iron-chromium complex was formed. The pH of the solution was 2. 1.8 parts of sodium carbonate (technical grade) was then admixed, whereby the pH of the solution was increased to 3.5. The resulting solution was added to 60 parts (solids basis) of a sulfonated lignin material. The latter material was sodium-base sulfite spent liquor, having a lignin sulfonate content of about 58% (solids basis) and a pH of 7, in form of a concentrated solution having about 50% solids content, supplied by the Crown Zellerbach Corporation, San Francisco, California, under the trademark Orzan SL–50. The above-mentioned constituents were mixed thoroughly for 60 minutes, at the end of which period the lignin-sulfonate-iron-chromium complex was formed. 6 parts of ferrous sulfate, corresponding to 1.2 of Fe metal, were added and the solution was mixed for 10 minutes. The pH of the resulting solution was 4.5. The solution was then spray-dried in a substantially reducing atmosphere at a temperature in the range of 170°–180° F. in a conventional spray-drying apparatus to produce a free-flowing, dry powder product containing 3% by weight of ferrous ion and characterized by being non-oxidative toward ferrous ion. The composition thus produced may be employed in its powdered form as an additive to drilling muds.

EXAMPLE 2

The reactants and the method of preparation of the composition of this invention were the same as in Example 1, except that 1.5 parts of sodium dichromate, corresponding to 0.5 part of Cr metal were employed. The resultant lignin-sulfonate-iron-chromium complex contained 4.5% by weight of ferrous ion, was non-oxidative toward ferrous ion and was very satisfactory as an additive to drilling muds.

EXAMPLE 3

The reactants and the method of preparation were the same as in Example 1, except that 6 parts of sodium dichromate, corresponding to 2.1 parts of Cr metal were employed. The resulting complex contained 2% by weight of ferrous ion and had similar properties to those of the composition of Example 1.

EXAMPLE 4

The reactants and the method of preparation were the same as in Example 1, except that 80 parts of sulfonated lignin (solids basis) and 12 parts of ferrous sulfate, corresponding to 2.4 parts of Fe metal were employed. The resulting complex had a 4.5% ferrous ion content by weight and had similar properties to those of the complex of Example 1.

EXAMPLE 5

The reactants and their amounts were the same as in Example 1, except that a water-soluble sulfonated kraft lignin product supplied by West Virginia Pulp & Paper Company under the trademark Polyphon T was employed instead of spent sulfite liquor. The method of mixing and reacting the constituents was the same as in Example 1; however the final liquid product in form of a paste was vacuum-dried to a dry powder. The resulting complex contained 3% of ferrous ion and was suitable as a drilling mud additive.

EXAMPLE 6

The reactants and the method of preparation were the same as in Example 1, except that a calcium-base lignin-sulfonate material obtained after fermentation of sulfite spent liquor and supplied by Lignosol Chemicals Limited, Quebec, Canada, under the trademark Lignosite was emplored. In addition, 0.3% based on the solids content of the complex of a defoaming agent, i.e. a substituted oxazoline, supplied by Commercial Solvents Corporation, San Francisco, California, under the trademark Alkaterge C, was metered into the solution just prior to the spray-drying operation. The ferrous ion content of the resulting complex was 3.2% by weight and its properties were substantially the same as those of the complex of Example 1.

EXAMPLE 7

In order to evaluate the effectiveness of compositions of this invention as drilling mud additives, 3 lbs./bbl. of the complex prepared in accordance with Example 6 was incorporated into a commercial betonite-based drilling mud together with 5 lbs./bbl. of gypsum, 5 lbs./bbl. of sodium chloride and sufficient sodium hydroxide to increase the pH of the mud to 10. The resulting mixture was heated for 30 minutes at 194° F., cooled to 68° F., and tested in accordance with the American Petroleum Institute procedures. The data obtained are given in Table 1 hereinbelow:

*Table 1*

| Viscosity,[1] cps. | Plastic Viscosity, cps. | Yield Value | Initial Gel Strength | 10 min. Gel Strength |
| --- | --- | --- | --- | --- |
| 8.5 | 7 | 3 | 0 | 3 |

[1] Fann viscosity at 600 r.p.m.

The above data clearly demonstrate the superior qualities of a drilling mud having incorporated therein a relatively small amount of a sulfonated-lignin-iron-chromium complex of this invention. One of the significant features of the compositons of this invention is that they are particularly effective as additives to drilling muds containing sodium chloride, since they stabilize and maintain such muds in fluid condition during drilling operation, as compared to other types of additives which cause mud gelatin.

From the foregoing it will be apparent that by the presently described invention I have developed a composition comprising a sulfonated lignin-iron-chromium complex which is characterized by many advantageous properties when applied to drilling muds. These and other advantages are obtained, furthermore, using a sulfonated lignin product which is readily available in large quantities at a very low cost and which heretofore has been considered as a waste by-product of the pulping industry.

Having described my invention in preferred embodiments, I claim:

1. A process of preparing a sulfonated-lignin-iron-chromium complex which comprises reacting together, in aqueous medium, a water-soluble iron salt, a water-soluble chromate, and a sulfonated lignin material, the amount of said lignin material being in excess of the combined amount of iron and chromium metals incorporated into the reaction mixture and the pH value of the resulting reaction product being between about 2 and about 5, and thereafter drying the resulting reaction product under substantially reducing conditions to form a non-oxidated sulfonated-lignin-iron-chromium complex containing at least 2% by weight of iron metal in the form of ferrous ion.

2. The process of claim 1 wherein the sulfonated-lignin-iron-chromium complex is spray-dried to a powdered form.

3. The process of claim 1 wherein the iron salt comprises a ferric salt.

4. The process of claim 1 wherein the iron salt comprises ferric sulfate.

5. The process of claim 1 wherein the iron salt comprises a mixture of a ferric salt and a ferrous salt.

6. The process of claim 1 wherein the water-soluble chromate comprises sodium dichromate.

7. The process of claim 1 wherein the sulfonated lignin material is a ligninsulfonate.

8. The process of claim 1 wherein the ratio of iron metal to chromium metal in the complex is at least 1.5:1, respectively.

9. A process of preparing a ligninsulfonate-iron-chromium complex adapted for use as a drilling mud additive which comprises mixing together, in aqueous medium, a water-soluble iron salt and a water-soluble chromate in such a ratio as to produce an iron-chromium complex containing about 1–20 parts by weight of iron metal and 0.25–3 parts by weight of chromium metal, admixing the resulting iron-chromium complex with 50–95 parts by weight, solids basis, of a ligninsulfonate, the pH value of the resulting complex being between about 2 and about 5, and thereafter spray-drying the resulting complex under substantially reducing conditions to a dry, free-flowing powder form characterized by being non-oxidative and containing at least 2% by weight of iron metal in the form of ferrous ion.

10. The process of claim 9 wherein the amounts of iron metal, chromium metal, and ligninsulfonate are 3–10, 0.5–2 and 60–70 parts by weight, respectively.

11. A process of producing a modified ligninsulfonate composition which comprises the following sequence of steps:

(a) interacting in aqueous medium a water-soluble chromate with a water-soluble ferric salt in a proportion to supply to the reaction from about 0.25 to 3 parts by weight of Cr metal supplied by said chromate and from about 1 to 20 parts by weight of Fe metal supplied by said ferric salt;

(b) intimately admixing the reaction mixture with from about 50 to 95 parts, dry solids basis, of a ligninsulfonate;

(c) interacting the resulting liquid reaction product with a water-soluble ferrous salt in an amount sufficient to supply to said product at least 2% by weight of Fe metal in the form of ferrous ion, the pH value of the resulting ferrous ion-containing reaction product being between about 2 and about 5; and (d) spray-drying the resulting ferrous ion-containing reaction product under substantially reducing conditions, whereby there is obtained a non-oxidative free-flowing, powdered ligninsulfonate-iron-chromium complex containing at least 2% by weight of iron metal in the form of ferrous ion.

12. A sulfonated-lignin-iron-chromium complex prepared by the process of claim 1.

References Cited in the file of this patent

UNITED STATES PATENTS

| | | |
|---|---|---|
| 2,209,591 | Barnes | July 30, 1940 |
| 2,858,271 | Byrd | Oct. 28, 1958 |
| 2,935,473 | King et al. | May 3, 1960 |
| 2,935,504 | King et al. | May 3, 1960 |

OTHER REFERENCES

Haynes: Chemical Trade Names and Commercial Synonyms, second edition, October 1955, published by D. Van Nostrand Co., Inc., New York, page 57.

UNITED STATES PATENT OFFICE
CERTIFICATE OF CORRECTION

Patent No. 3,035,042            May 15, 1962

Charles H. Hoyt

It is hereby certified that error appears in the above numbered patent requiring correction and that the said Letters Patent should read as corrected below.

Column 6, lines 18 and 19, for "non-oxidated" read -- non-oxidative --.

Signed and sealed this 11th day of September 1962.

(SEAL)
Attest:

ERNEST W. SWIDER
Attesting Officer

DAVID L. LADD
Commissioner of Patents